(12) United States Patent
Bremmer et al.

(10) Patent No.: US 11,001,305 B2
(45) Date of Patent: May 11, 2021

(54) VEHICLE WITH ELECTRICAL DISTRIBUTION SYSTEM ROUTED THROUGH FRAME

(71) Applicant: Ford Global Technologies, LLC, Dearborn, MI (US)

(72) Inventors: Darin Joseph Bremmer, Howell, MI (US); Carlos Ayala, Novi, MI (US); Masahiro Kimoto, Plymouth, MI (US); Leann Vernon, Dearborn, MI (US); Patrick Daniel Maguire, Ann Arbor, MI (US); Bradley Arnold Lammers, Canton, MI (US); Doug G. Hughes, South Lyon, MI (US); Pratyaksh Kamath, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 15/921,053

(22) Filed: Mar. 14, 2018

(65) Prior Publication Data
US 2019/0283807 A1    Sep. 19, 2019

(51) Int. Cl.
*B62D 21/17* (2006.01)
*H02G 5/02* (2006.01)
*B60R 16/023* (2006.01)

(52) U.S. Cl.
CPC .......... *B62D 21/17* (2013.01); *B60R 16/0238* (2013.01); *H02G 5/02* (2013.01); *Y10S 903/952* (2013.01)

(58) Field of Classification Search
CPC ........ B62D 21/02; B62D 21/12; B62D 21/14; B62D 25/025; B62D 27/023; B62D 29/041; B62D 25/16

USPC .......... 296/208, 70, 192, 214, 63, 108, 154, 296/97.23, 72; 180/65.1, 402, 165, 291, 180/90, 69.4, 68.1
See application file for complete search history.

(56) References Cited

U.S. PATENT DOCUMENTS

| | | | |
|---|---|---|---|
| 5,091,604 A | 2/1992 | Kirma | |
| 7,563,981 B2 | 7/2009 | Ichikawa et al. | |
| 7,850,191 B1* | 12/2010 | Kaminski | B60D 1/64 |
| | | | 280/422 |
| 8,617,687 B2 | 12/2013 | McCarville et al. | |
| 8,668,253 B2* | 3/2014 | Bauer | B60R 16/0215 |
| | | | 296/199 |
| 10,023,137 B2* | 7/2018 | Chinavare | B60K 1/04 |
| 2011/0088944 A1* | 4/2011 | Ogue | B60R 16/0215 |
| | | | 174/72 A |
| 2013/0206496 A1* | 8/2013 | Hashimoto | B62D 27/023 |
| | | | 180/291 |

OTHER PUBLICATIONS

Pawlick, Dominik. "Sorting Busbar Choices for Electric Vehicle Power Distribution," Rogers Corp., Power Electronics Solutions (PES), Sep. 2016. Posted on http://batterypoweronline.com/articles.

* cited by examiner

*Primary Examiner* — D Glenn Dayoan
*Assistant Examiner* — Sunsurraye Westbrook
(74) *Attorney, Agent, or Firm* — David B. Kelley; Carlson, Gaskey & Olds, P.C.

(57) ABSTRACT

A motor vehicle according to an exemplary aspect of the present disclosure includes, among other things, a frame including a rail and an electrical distribution system routed at least partially through the rail. A method is also disclosed.

13 Claims, 3 Drawing Sheets

VEHICLE WITH ELECTRICAL DISTRIBUTION SYSTEM ROUTED THROUGH FRAME

TECHNICAL FIELD

This disclosure relates to a motor vehicle with an electrical distribution system routed through the vehicle frame, and a corresponding method.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles in that electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. Electrified vehicles are known to include electrical distribution systems, which include a number of electrical cables and connectors, coupling the electric machine and other loads to the traction battery.

SUMMARY

A motor vehicle according to an exemplary aspect of the present disclosure includes, among other things, a frame including a rail and an electrical distribution system routed at least partially through the rail.

In a further non-limiting embodiment of the foregoing motor vehicle, the electrical distribution system includes a line routed at least partially through the rail.

In a further non-limiting embodiment of any of the foregoing motor vehicles, the vehicle further comprises an electrical connector mounted to the frame. The electrical connector is electrically coupled to the line and configured to electrically couple to a component outside the rail.

In a further non-limiting embodiment of any of the foregoing motor vehicles, the electrical connector is mounted to the frame by a header plate.

In a further non-limiting embodiment of any of the foregoing motor vehicles, an electromagnetic interference (EMI) shield is wrapped around a section of the line projecting outward of the rail.

In a further non-limiting embodiment of any of the foregoing motor vehicles, the line is an electrical cable routed at least partially through the rail.

In a further non-limiting embodiment of any of the foregoing motor vehicles, the electrical cable is unshielded.

In a further non-limiting embodiment of any of the foregoing motor vehicles, an entirety of the electrical cable is within the rail.

In a further non-limiting embodiment of any of the foregoing motor vehicles, the line is a bus bar arranged at least partially within the rail.

In a further non-limiting embodiment of any of the foregoing motor vehicles, an entirety of the bus bar is within the rail.

In a further non-limiting embodiment of any of the foregoing motor vehicles, the bus bar is one of a single-phase bus bar and a three-phase bus bar.

In a further non-limiting embodiment of any of the foregoing motor vehicles, the vehicle further comprises a first component and a second component electrically coupled to the first component by way of the electrical distribution system.

In a further non-limiting embodiment of any of the foregoing motor vehicles, the first component is a battery pack and the second component is one of a motor and a generator.

In a further non-limiting embodiment of any of the foregoing motor vehicles, the frame is made of a metallic material.

A method according to an exemplary aspect of the present disclosure includes, among other things, supplying power from a first component to a second component via an electrical distribution system. The electrical distribution system is at least partially routed through a rail of a vehicle frame.

In a further non-limiting embodiment of the foregoing method, the electrical distribution system includes a line routed at least partially through the rail.

In a further non-limiting embodiment of any of the foregoing methods, the line is one of an electrical cable and a bus bar.

In a further non-limiting embodiment of any of the foregoing methods, an entirety of the line is within the rail.

In a further non-limiting embodiment of any of the foregoing methods, the line is electrically coupled to a component outside the rail via an electrical connector mounted to the rail.

In a further non-limiting embodiment of any of the foregoing methods, the first component is a battery pack and the second component is one of a motor and a generator.

DETAILED DESCRIPTION

This disclosure relates to a motor vehicle with an electrical distribution system routed through the vehicle frame, and a corresponding method. An example motor vehicle of this disclosure includes a frame with a rail, and an electrical distribution system routed at least partially through the rail. Routing the electrical distribution system partially through the rail has a number of benefits. For one, the rail is a preexisting vehicle structure, and routing the electrical distribution system partially through the rail increases the ease of packaging the electrical distribution system. Further, the rail acts as an electromagnetic interference (EMI) shield, and thus a relatively large section of the electrical distribution system does not need to be separately shielded, which leads to reduced cost. Further still, the rail enables the use of relatively inexpensive components in the electrical distribution system, such as bus bars.

Figure 1:
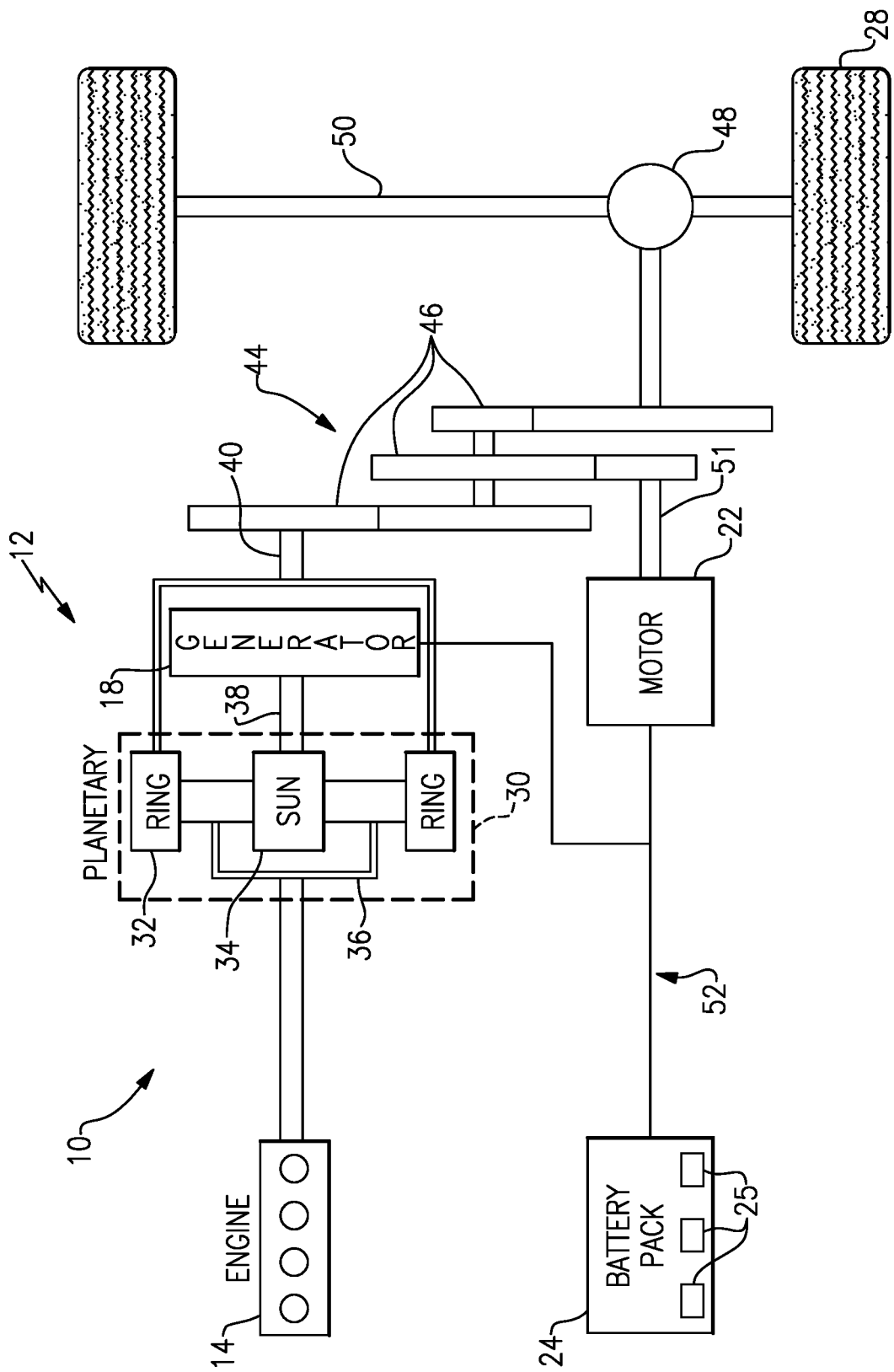
FIG. 1 schematically illustrates a powertrain of an electrified vehicle.

Referring to the drawings, FIG. 1 schematically illustrates a powertrain 10 for a motor vehicle, which in this example is an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs). This disclosure also extends to conventional motor vehicles which rely exclusively on internal combustion engines.

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, micro hybrids, plug-in hybrids, and battery electric vehicles. This disclosure also extends to motor vehicles that are not electrified vehicles, including motor vehicles having only an internal combustion engine.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 51 that is also connected to the second power transfer unit 44. In one embodiment, the motor 22 and the generator 18 cooperate as part of a regenerative braking system in which both the motor 22 and the generator 18 can be employed as motors to output torque. In another example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12 via an electrical distribution system 52, which is discussed below. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 includes an electrical distribution system 52 (sometimes abbreviated "EDS") configured to electrically couple certain electrical components of the electrified vehicle 12 to one another. In FIG. 1, the electrical distribution system 52 is shown schematically. It should be understood that the electrical distribution system 52 includes one or more electrical wires, electrical cables, bus bars (sometimes spelled "busbars"), electrical connectors, etc., as necessary to electrically couple electrical components to one another.

In FIG. 1, the electrical distribution system 52 electrically couples at least two components to one another. Specifically, the electrical distribution system 52 electrically couples the battery pack 24 to the motor 22 and the generator 18. The battery pack 24 is configured to supply power to the motor 22 via the electrical distribution system 52. The generator 18 is also configured to supply power to the battery pack 24 via the electrical distribution system 52. The electrical distribution system 52 may electrically couple the battery pack 24 to additional vehicle loads in other examples.

Figure 2:
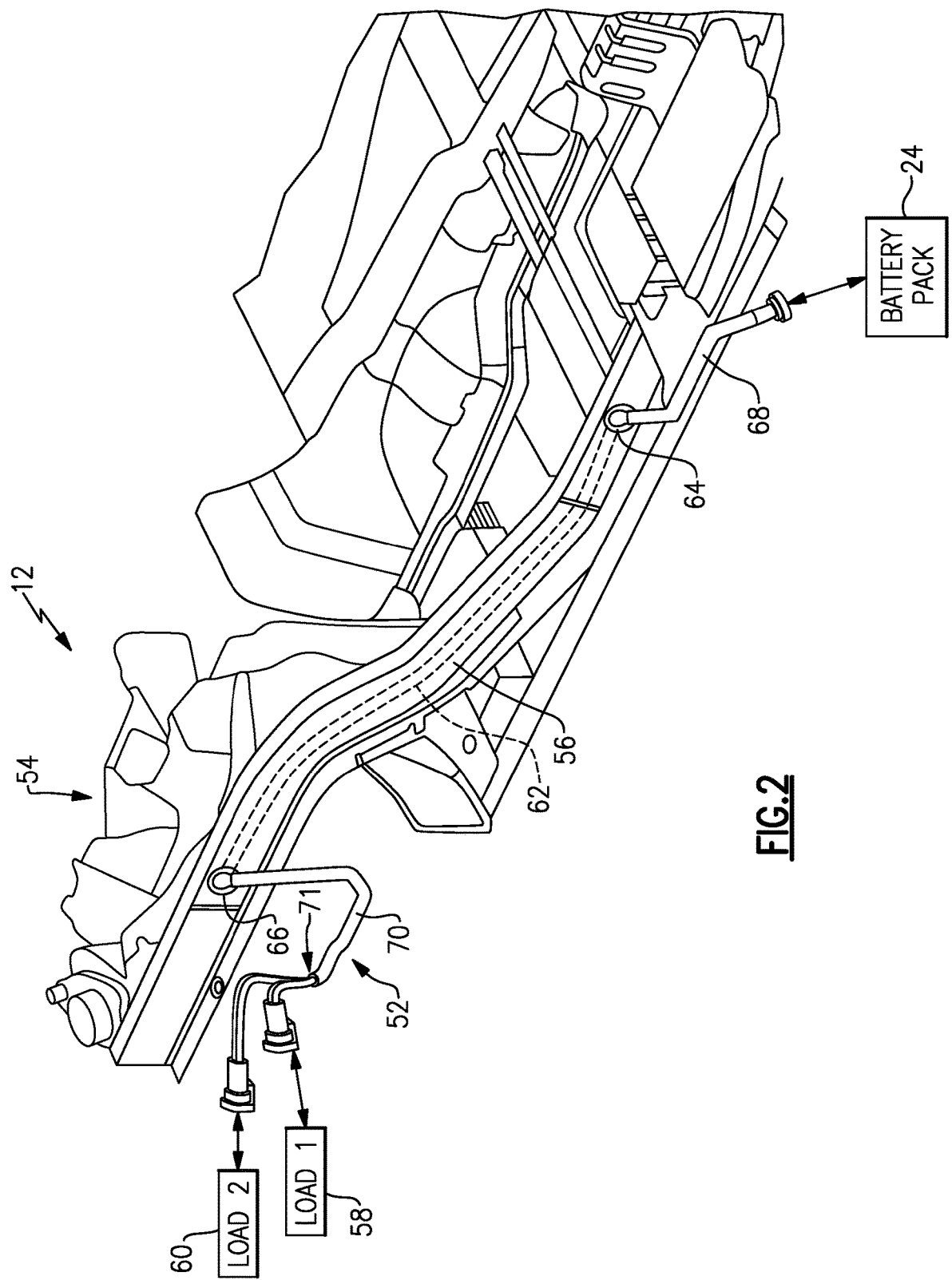
FIG. 2 illustrates a portion of the electrified vehicle, and in particular illustrates a portion of a vehicle frame.

FIG. 2 illustrates a portion of the electrified vehicle 12. In particular, FIG. 2 illustrates a portion of a frame 54 of the electrified vehicle 12. The frame 54 (sometimes referred to as a "vehicle frame") is the main supporting structure of the electrified vehicle 12, to which all other components are attached, either directly or indirectly. The frame 54 may be of a unibody construction, wherein the chassis and body of the vehicle are integrated into one another. The frame 54 is made of a metallic material, such as steel, carbon steel, or aluminum alloy, as examples.

The frame 54 includes a plurality of rails (sometimes referred to as "frame rails" or "beams"). FIG. 2 shows one such rail 56. The rail 56 is a structure extending along a side of the electrified vehicle 12. The electrified vehicle typically includes two such rails, which are connected together by other structures of the frame 54.

The rail 56, in this example, is an enclosed, hollow structure. The rail 56 may be formed of tubing. Alternatively, the rail 56 may be formed using an extrusion process. Further still, the rail 56 be formed of a piece of material that has been bent into four sides and welded closed where the ends meet. This disclosure is not limited to any particular method of forming the rail 56.

FIG. 2 illustrates, somewhat schematically, the battery pack 24 electrically coupled to a first load 58 (labeled "Load 1") and a second load 60 (labeled "Load 2") via the electrical distribution system 52. The first and second loads 58, 60 are representative of one or more vehicle loads, including the motor 22, the generator 18, and any other load.

The electrical distribution system 52 is routed at least partially through the rail 56. In this example, the electrical distribution system 52 includes a line 62, which is shown in phantom in FIG. 2, routed at least partially through the rail 56. The line 62 may be an electrical wire, electrical cable, a bundle of wires or cables, or a bus bar, as examples. The line 62 is configured to distribute power between the battery pack 24 and the loads 58, 60.

In this example, the line 62 is electrically coupled to a first electrical connector 64 at a first end of the line 62, and to a second electrical connector 66 at a second end of the line 62. The first and second electrical connectors 64, 66 are mounted to the frame 54, and in particular are mounted to the rail 56. The first and second electrical connectors 64, 66 may be any type of known electro-mechanical device configured to electrically couple the line 62 to components outside the rail 56, such as the battery pack 24 and the loads 58, 60. In particular, the first and second electrical connectors 64, 66 may be plugs, jacks, sockets, or other types of male or female electrical connectors.

In this example, the first electrical connector 64 is mounted to the rail 56 adjacent a first end of the electrified vehicle 12, which is adjacent the battery pack 24. The first electrical connector 64 is electrically coupled to a first exterior wire 68, which is electrically coupled to the battery pack 24. The second electrical connector 66 is mounted to the rail adjacent a second end of the electrified vehicle spaced-apart from the first electrical connector 64, which is adjacent the loads 58, 60. The second electrical connector 66 is electrically coupled to the loads 58, 60 via a second exterior wire 70. The second exterior wire 70, in this example, splits at a point 71 between the second electrical connector 66 and the loads 58, 60.

The illustrated electrical distribution system 52 includes the line 62, electrical connectors 64, 66, and exterior wires 68, 70. Together, these components are configured to supply power to and from the battery pack 24 and the loads 58, 60. By routing a portion of the electrical distribution system 52 through the rail 56, there are a number of benefits, many of which have been mentioned above and will be appreciated from the below discussion. While a particular arrangement has been shown, it should be understood that the electrical distribution system 52 may be arranged differently.

Figure 3:
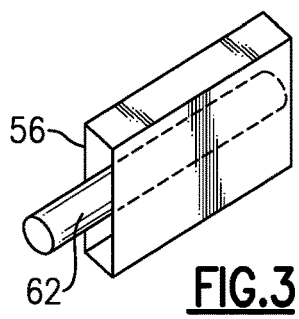
FIG. 3 illustrates an electrical cable within a rail of the vehicle frame.

FIG. 3 is a perspective, sectional view of the line 62 arranged relative to the rail 56, with the remainder of the vehicle 12 removed for ease of reference. As shown in FIG. 3, the rail 56 is a hollow, enclosed structure, and is substantially rectangular in cross section. The line 62 is routed through the interior of the rail 56. Routing the line 62 through the rail 56 makes it easier to package the electrical distribution system 52 within the electrified vehicle 12. Since the rail 56 is a preexisting vehicle structure, routing the line 62 through the rail 56 does not require additional packaging.

The line 62, in the example of FIG. 3, is an electrical cable. Specifically, the line 62 is a high voltage electrical cable capable of handling the relatively high voltages known to be associated with the battery pack 24. Further, in this example, the line 62 is unshielded. That is, unlike most high voltage electrical cables, the line 62 is not wrapped in an electromagnetic interference (EMI) shield. Rather, the rail 56, which is made of a metallic material, acts as an EMI shield for the line 62. Since the line 62 does not require its own EMI shield, it is easier to manufacture and less expensive.

Figure 4A:
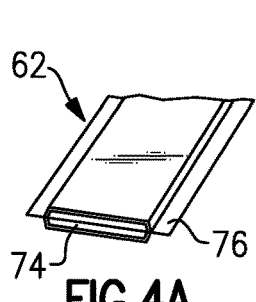
FIG. 4A illustrates a first example bus bar.
Figure 4B:
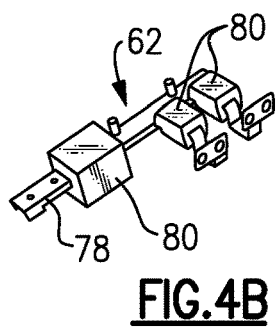
FIG. 4B illustrates a second example bus bar.
Figure 4C:
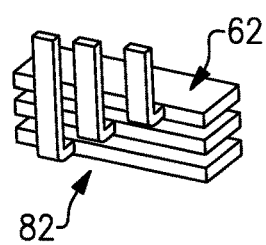
FIG. 4C illustrates a third example bus bar.

As generally mentioned above, the line 62 may also be provided by a bus bar. Three example bus bars are shown across FIGS. 4A-4C. With reference to FIG. 4A, the line 62 may be a single phase bus bar 74 having a laminate 76, which protects the bus bar 74 from grounding. With reference to FIG. 4B, the line 62 may alternatively be a single phase bus bar 78 with one or more ceramic chokes 80, which also protect the bus bar 78 from grounding. Further still, with reference to FIG. 4C, the line 62 may be a three phase bus bar 82.

Regardless of the type of bus bar, the rail 56 enables the use of a bus bar between the first and second electrical connectors 64, 66. For one, the rail 56 acts as an EMI shield for the line 62. Further, whereas bus bars are typically relatively difficult to package in a vehicle due to their limited flexibility, the rail 56 is relatively straight and protects the line 62 from contact with exterior components. Thus, a relatively rigid bus bar can extend from the first electrical connector 64 to the second electrical connector 66. Bus bars are relatively inexpensive, and thus using a bus bar for the line 62 may further reduce expense.

Whether a bus bar or electrical cable is used for the line 62, in one example of this disclosure the entirety of the line 62 resides within the rail 56. That is, the line 62 is assembled within the rail 56 during the manufacture and assembly of the electrified vehicle 12, and the line 62 is intended to remain within the rail 56 during use of the electrified vehicle 12. The line 62 is electrically coupled to various components via the electrical connectors 64, 66, which are mounted to the rail 56. In other examples, ends of the line 62 may project outward of the rail 56, with the line 62 still substantially within the rail 56.

Figure 5:
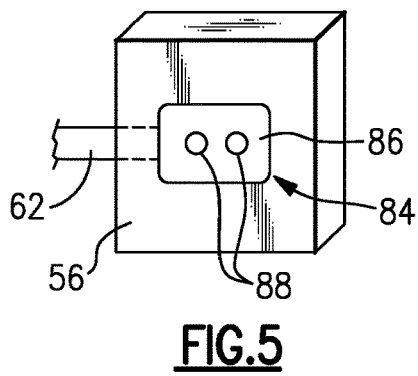
FIG. 5 illustrates a first example electrical connector mounted to the vehicle frame.
Figure 6:
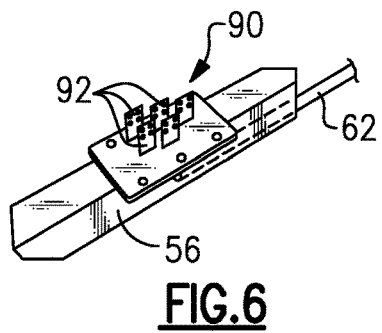
FIG. 6 illustrates a second example electrical connector mounted to the vehicle frame.

FIGS. 5 and 6 illustrate example electrical connectors for use when the line 62 is entirely within the rail 56. With reference to FIG. 5, an example electrical connector 84 is mounted to a side of the rail 56. The electrical connector 84 includes a header plate 86, which may be substantially flush with a surface of the rail 56, and connecting pins 88. The connecting pins 88 are representative of a male connection, which is configured to couple to a female connection of one of the exterior lines 70, 72, for example. The connecting pins 88 could be replaced by a female connection in other examples.

FIG. 6 illustrates another example electrical connector 90 mounted to a side of the rail 56. The electrical connector 90 includes a plurality of connecting tabs 92, which are male electrical connectors configured to couple to a female connection of one of the exterior lines 70, 72.

Figure 7:
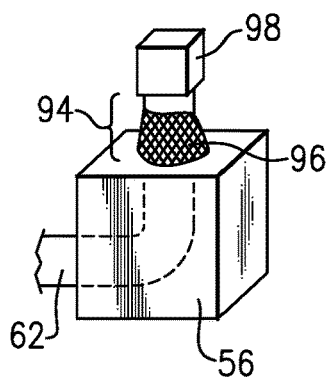
FIG. 7 illustrates a third example electrical connector arranged relative to the vehicle frame.

FIG. 7 illustrates an example electrical connector for use when the line 62 projects partially outward of the rail 56. In FIG. 7, a section 94 of the line 62 projects outward of the rail 56. Because the line 62 is unshielded, an EMI shield 96, such as a metallic mesh material, is wrapped around the section 94. The section 94 is shown only partially shielded in FIG. 7 for ease of reference, but it should be understood that the entirety of the section 94 would be covered by the EMI shield 96. The EMI shield 96 extends between the rail 56 and an electrical connector 98, which is configured to electrically couple to one of the exterior lines 70, 72. The electrical connector 98 is shown schematically in FIG. 7. It should be understood that the electrical connector 98 could be a male or female connector.

The electrical connectors 64, 66 could be provided by any type of electrical connector, including those illustrated in FIGS. 5, 6, and 7. It should be understood that FIGS. 5, 6, and 7 show example electrical connectors only. This disclosure extends to other types of electrical connectors.

It should be understood that terms such as "side," "outward," "interior," etc., are directional terms made with reference to the normal operational attitude of the components being described. These directional terms are used for purposes of explanation only, and should not otherwise be considered to be limiting. Further, terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
    a frame including a rail; and
    an electrical distribution system routed at least partially through the rail,
    wherein the electrical distribution system includes a line,
    wherein the line is not wrapped in an electromagnetic interference shield, and
    wherein an entirety of the line is within the rail.

2. The motor vehicle as recited in claim 1, further comprising an electrical connector mounted to the frame, the electrical connector electrically coupled to the line and configured to electrically couple to a component outside the rail.

3. The motor vehicle as recited in claim 2, wherein the electrical connector is mounted to the frame by a header plate.

4. The motor vehicle as recited in claim 1, wherein the line is an electrical cable.

5. The motor vehicle as recited in claim 1, wherein the line is a bus bar arranged at least partially within the rail.

6. The motor vehicle as recited in claim 5, wherein the bus bar is one of a single-phase bus bar and a three-phase bus bar.

7. The motor vehicle as recited in claim 1, further comprising:
    a first component; and
    a second component electrically coupled to the first component by way of the electrical distribution system.

8. The motor vehicle as recited in claim 7, wherein the first component is a battery pack and the second component is one of a motor and a generator.

9. The motor vehicle as recited in claim 1, wherein the frame is made of a metallic material.

10. A method, comprising:
    supplying power from a first component to a second component via an electrical distribution system, the electrical distribution system at least partially routed through a rail of a vehicle frame,
    wherein the electrical distribution system includes a line,
    wherein the line is not wrapped in an electromagnetic interference shield, and
    wherein an entirety of the line is within the rail.

11. The method as recited in claim 10, wherein the line is one of an electrical cable and a bus bar.

12. The method as recited in claim 10, wherein the line is electrically coupled to a component outside the rail via an electrical connector mounted to the rail.

13. The method as recited in claim 10, wherein the first component is a battery pack and the second component is one of a motor and a generator.

* * * * *